(12) United States Patent
Tsai (10) Patent No.: US 11,370,042 B1
(45) Date of Patent: Jun. 28, 2022

(54) CUTTER

(71) Applicant: HONG JIN INDUSTRY CO., LTD., Taichung (TW)

(72) Inventor: Chung Tsai, Taichung (TW)

(73) Assignee: HONG JIN INDUSTRY CO., LTD., Taichung (TW)

( * ) Notice: Subject to any disclaimer, the term of this patent is extended or adjusted under 35 U.S.C. 154(b) by 0 days.

(21) Appl. No.: 17/124,421

(22) Filed: Dec. 16, 2020

(51) Int. Cl.
| | | |
|---|---|---|
| *B23D 21/06* | (2006.01) | |
| *B26D 3/16* | (2006.01) | |
| *B25B 7/12* | (2006.01) | |
| *B26B 5/00* | (2006.01) | |

(52) U.S. Cl.
CPC ............... *B23D 21/06* (2013.01); *B25B 7/12* (2013.01); *B26D 3/169* (2013.01); *B26B 5/00* (2013.01)

(58) Field of Classification Search
CPC .... B25B 7/00; B25B 7/02; B25B 7/12; B25B 7/123; B25B 7/04; B25B 7/18; B23D 21/06; B26D 3/169; B26B 13/28; B26B 13/285; B26B 17/00

See application file for complete search history.

(56) References Cited

U.S. PATENT DOCUMENTS

| | | | | |
|---|---|---|---|---|
| 7,328,513 | B1 * | 2/2008 | Yang | B26B 17/02 30/178 |
| 9,622,422 | B2 * | 4/2017 | Hsu | B26B 13/26 |
| 2013/0118015 | A1 * | 5/2013 | Smith | B26B 17/00 30/92 |
| 2018/0326513 | A1 * | 11/2018 | Chen | B23D 21/06 |
| 2018/0354044 | A1 * | 12/2018 | Nordlin | B23D 21/10 |

FOREIGN PATENT DOCUMENTS

CN          207373213 U * 5/2018 ............... B25B 7/14

\* cited by examiner

*Primary Examiner* — Jennifer S Matthews
(74) *Attorney, Agent, or Firm* — Bruce Stone LLP; Joseph A. Bruce (57) ABSTRACT

A cutter includes a blade, a handle, a holder, a pivot and a pin. The blade includes an aperture and a slit. The handle includes two lateral plates each of which includes an aperture and a recess. The holder includes a block formed between two lateral plates. The block is inserted in the slit when the blade is inserted in the holder. Each of the lateral plates of the holder includes a rear aperture and a front aperture. The pivot is selectively inserted in the apertures of the handle, the front apertures of the holder and the aperture of the blade to keep the holder in the handle. The pin is selectively inserted in the recesses of the handle and the rear apertures of the holder to keep the holder in a desired angle relative to the handle.

9 Claims, 10 Drawing Sheets

CUTTER

BACKGROUND OF INVENTION

1. Field of Invention

The present invention relates to a pipe cutter and, more particularly, to pipe cutter with an easily replaceable blade.

2. Related Prior Art

There are various pipe cutters. Each of the pipe cutters is provided with a blade. However, the blade is not replaceable. Hence, the entire pipe cutter must be disposed of if the blade is out of order.

The present invention is therefore intended to obviate or at least alleviate the problems encountered in the prior art.

SUMMARY OF INVENTION

It is the primary objective of the present invention to provide an effort-saving cutter.

To achieve the foregoing objective, the cutter includes a blade, a handle, a holder, a pivot and a pin. The blade includes an aperture and a slit. The handle includes two lateral plates each of which includes an aperture and a recess. The holder includes two lateral plates located between the lateral plates of the handle and a block formed between the lateral plates. The block is inserted in the slit when the blade is inserted in the holder. Each of the lateral plates of the holder includes a rear aperture and a front aperture. The pivot is selectively inserted in the apertures of the handle, the front apertures of the holder and the aperture of the blade to keep the holder in the handle. The pin is selectively inserted in the recesses of the handle and the rear apertures of the holder to keep the holder in a desired angle relative to the handle.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Referring to FIGS. 1 through 7, a cutter 10 includes a cutting board 11, two handles 20 and 30, a blade set 46, a holder 50, and two pawls 60 and 70 according to the preferred embodiment of the present invention. The cutting board 11 includes a recess 12 in a rear portion and a fin 16 extending from a lower face.

Figure 1:
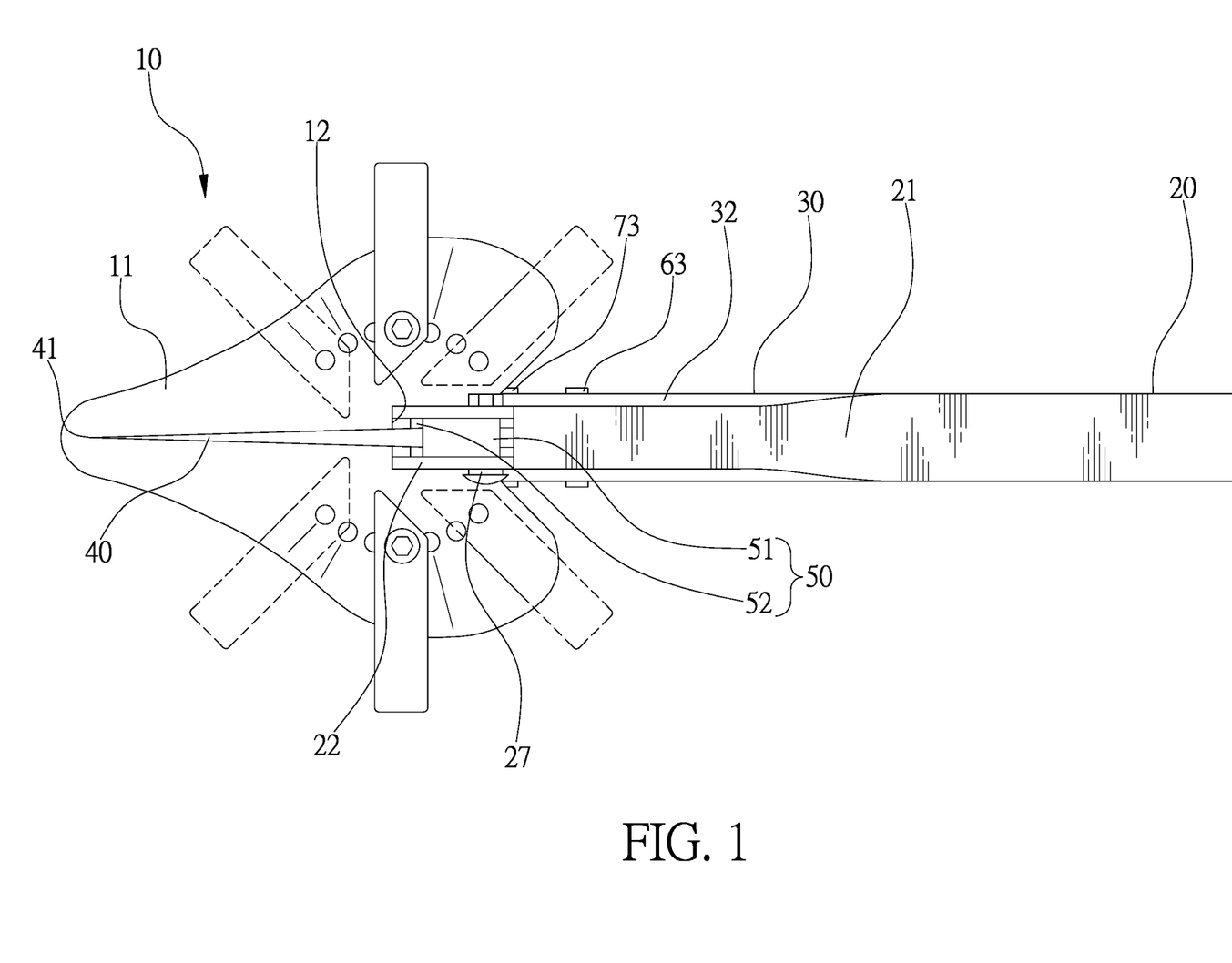
FIG. 1 is a top view of a pipe cutter according to the preferred embodiment of the present invention.
Figure 2:
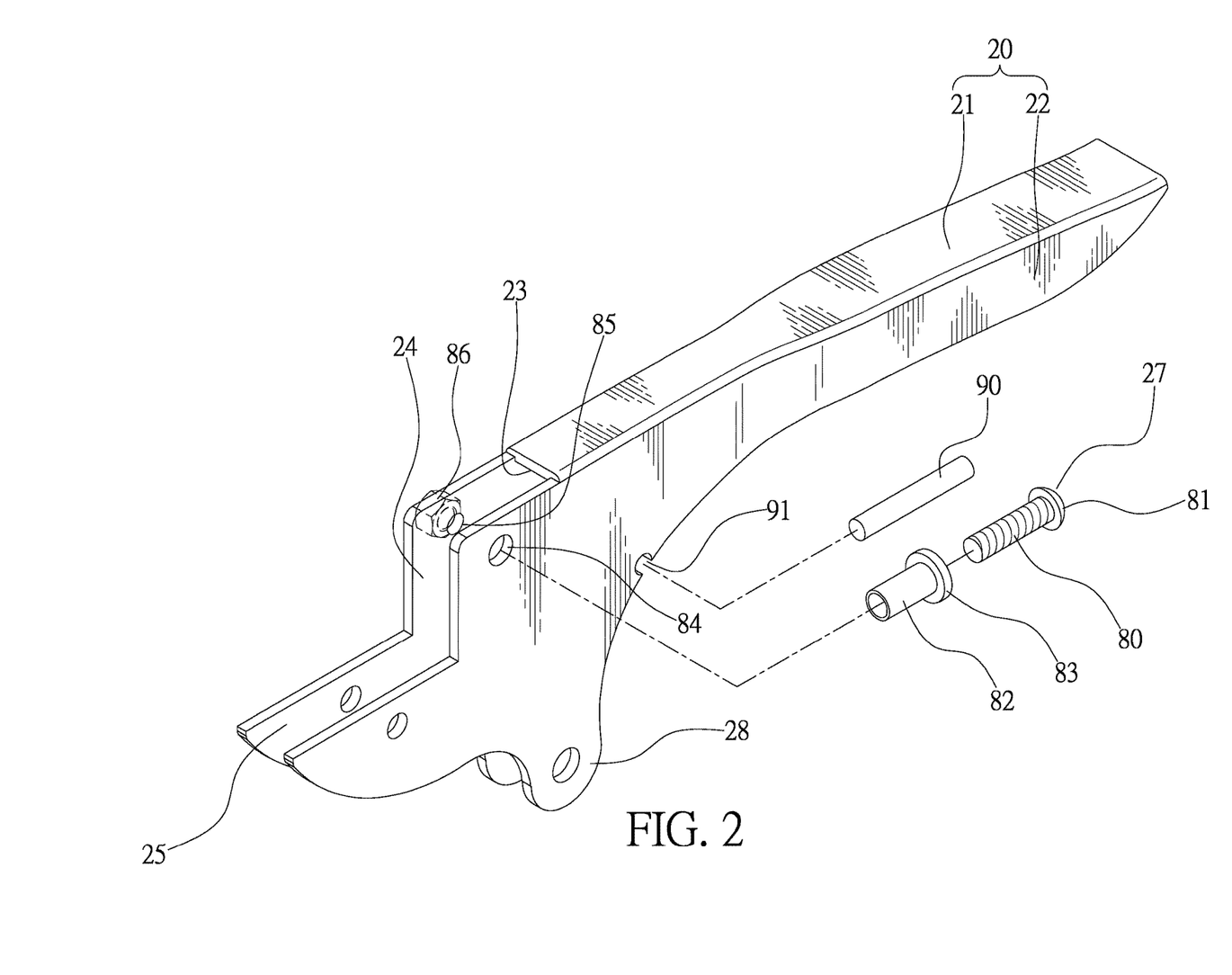
FIG. 2 is a perspective view of a handle of the pipe cutter depicted in FIG. 1.

Referring to FIGS. 1 and 2, the handle 20 is made by bending a piece of metal so that it includes a top plate 21 between two lateral plates 22, thereby providing a space 23. Each of the lateral plates 22 includes a rear portion (not numbered), a front portion 25, a stepped portion 24 formed between the rear portion and the front portion 25, and a lug 28 extending from a lower edge. The front portions 25 of the lateral plates 22 extend beyond a front portion of the top plate 21 so that there is a gap (not numbered) between the front portions 25 of the lateral plates 22, in front of the front portion of the top plate 21. The stepped portion 24 of one of the lateral plates 22 is formed with an aperture 84. The stepped portion 24 of the remaining one of the lateral plates 22 is formed with an aperture 85 smaller than the aperture 84. Each of the lateral plates 22 is formed with a recess 91 at the lower edge, behind the lug 28.

A pivot 27 preferably includes a threaded bolt 80, a sleeve 82 and a nut 86. The threaded bolt 80 includes a head 81. The sleeve 82 is formed with a flange 83. The sleeve 82 is inserted in the aperture 84 so that the flange 83 is abutted against the corresponding lateral plate 22. The threaded bolt 80 extends through the sleeve 82 and the aperture 85. The nut 86 is engaged with the threaded bolt 80.

Figure 3:
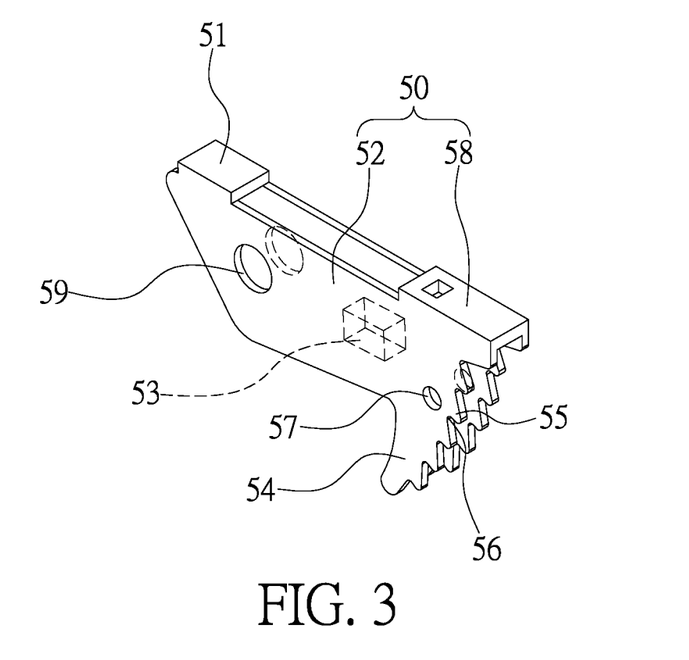
FIG. 3 is a perspective view of a holder of the pipe cutter shown in FIG. 1.

Referring to FIGS. 1 and 3, the holder 50 includes a front top plate 51, a rear top plate 58, two lateral plates 52 and a block 53. The front top plate 51 is formed between two lateral plates 52, and so is the rear top plate 58. The block 53 is also formed between the lateral plates 52. Each of the lateral plates 52 includes a ratchet 54 at a rear end, an aperture 57 in the ratchet 54, and an aperture 59 in the vicinity of a front end. The ratchet 54 of each of the lateral plates 52 includes teeth 55 and valleys 56 alternately arranged along an edge. The teeth 55 are ratchet teeth.

Figure 4:
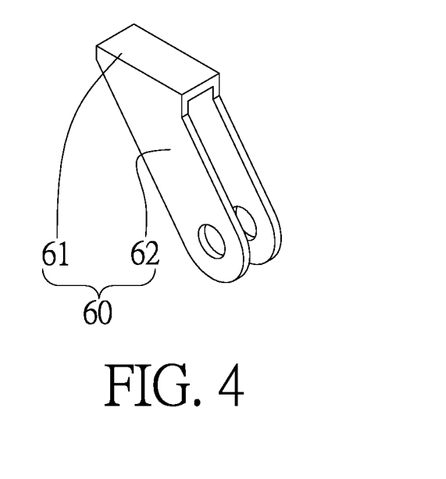
FIG. 4 is a perspective view of a primary pawl of the pipe cutter shown in FIG. 1.

Referring to FIGS. 1 and 4, the pawl 60 includes a middle plate 61 formed between two lateral plates 62.

Figure 5:
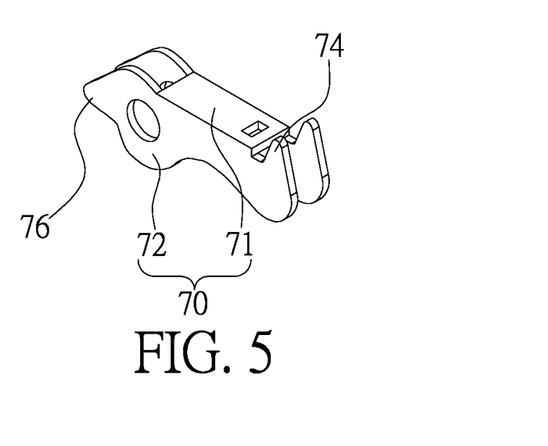
FIG. 5 is a perspective view of a secondary pawl of the pipe cutter shown in FIG. 1.

Referring to FIGS. 1 and 5, the pawl 70 includes a middle plate 71 formed between two lateral plates 72. Each of the lateral plates 72 is formed with two tips 74 and 76.

Figure 6:
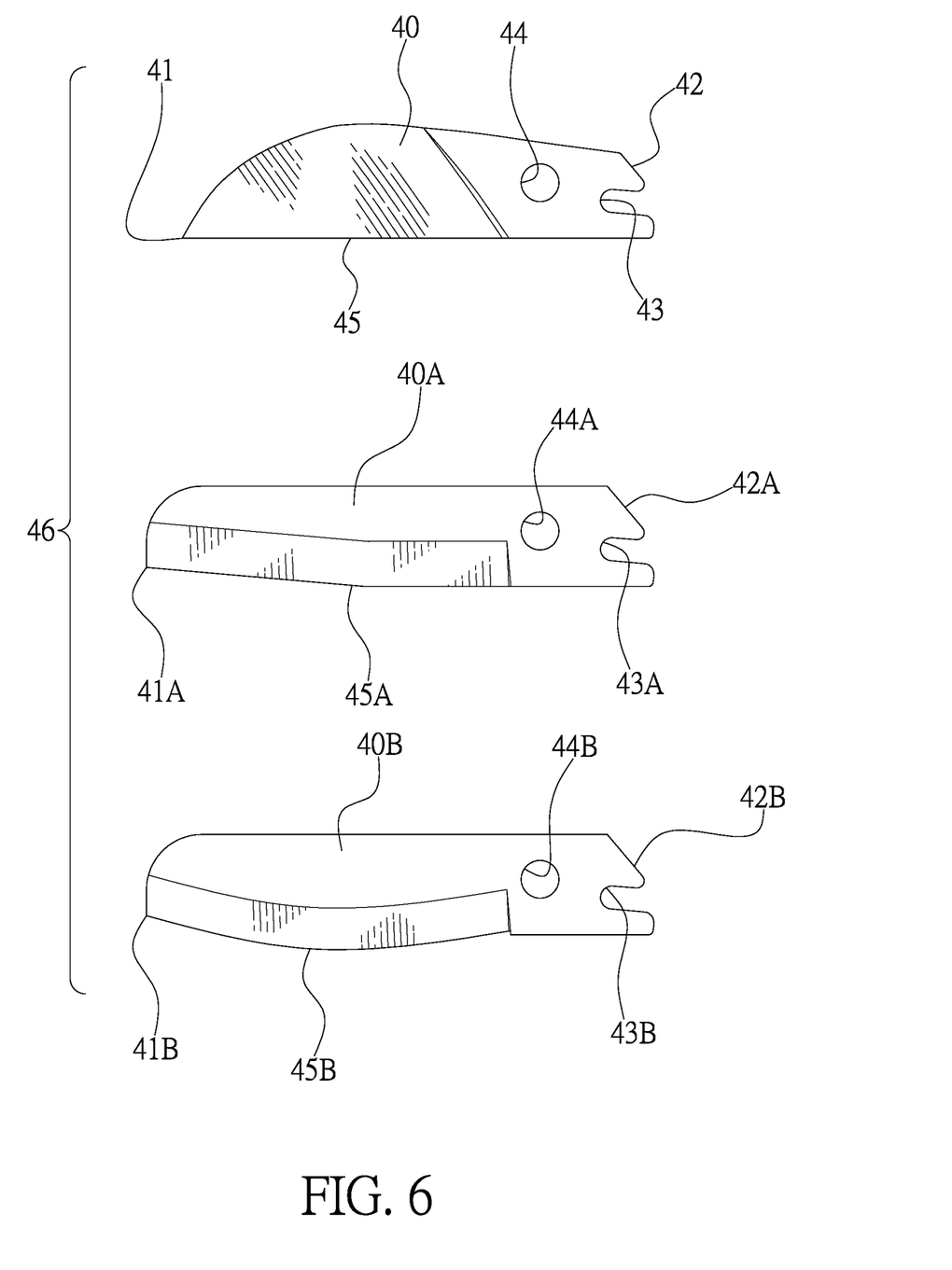
FIG. 6 is a side view of various blades for use in the pipe cutter shown in FIG. 1.

Referring to FIG. 6, the blade set 46 includes three blades 40, 40A and 40B that can be used in the cutter 10. The blade set 46 can further include any other proper blade. The blades 40, 40A and 40B are different from one another in shape but similar to one another in configuration and function. The blade 40 includes a front end 41, a rear end 42, a slit 43, an aperture 44 and a cutting edge 45. The slit 43 is made in the rear end 42. The aperture 44 is located further from the front end 41 than the rear end 42. The cutting edge 45 extends between the front end 41 and the rear end 42. Similarly, the blade 40A includes a front end 41A, a rear end 42A, a slit 43A, an aperture 44A and a cutting edge 45A. Similarly, the blade 40B includes a front end 41B, a rear end 42B, a slit 43B, an aperture 44B and a cutting edge 45B.

Figure 7:
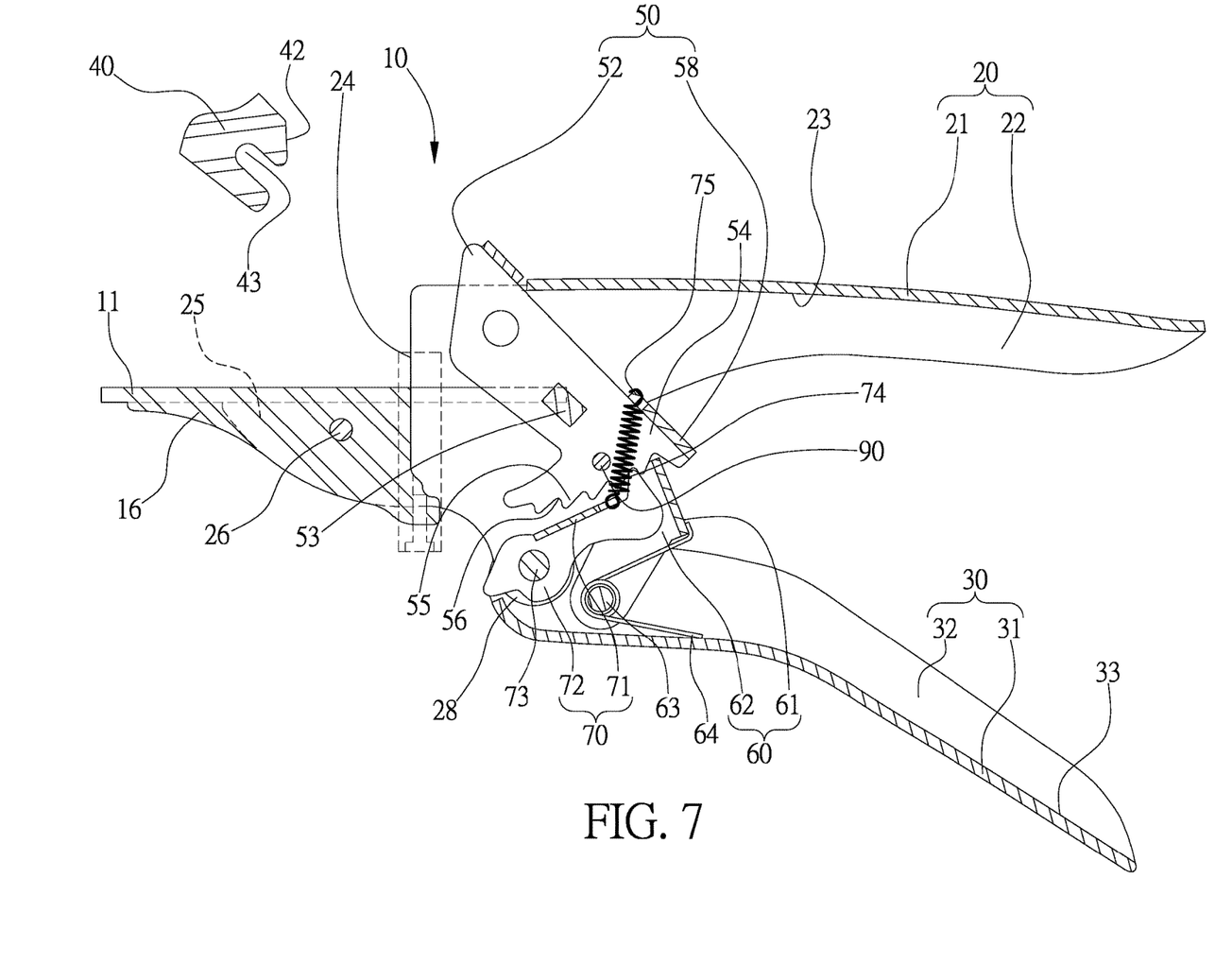
FIG. 7 is a cross-sectional view of the pipe cutter shown in FIG. 1 without the blade.

Referring to FIG. 7, the handle 30 includes a bottom plate 31 formed between two lateral plates 32. Thus, there is a space 33 above the bottom plate 31, between the lateral plates 32.

Referring to FIGS. 1 and 7, the stepped portions 24 of the lateral plates 22 of the handle 20 are inserted in the recess 12 of the cutting board 11 so that the cutting board 11 is located on the front portions 25 of the lateral plates 22 of the handle 20. The fin 16 is located between the front portions 25 of the lateral plates 22 of the handle 20. The fastener 26 is fitted in the front portions 25 of the lateral plates 22 and the fin 16 to connect the cutting board 11 to the handle 20.

A rear portion of the blade 40 is located between the lateral plates 52 of the holder 50. The block 53 is inserted in the slit 43. The front top plate 51 is preferably in contact with an upper edge of the blade 40. The lateral plates 52 of the holder 50 are located between the lateral plates 22 of the handle 20.

Referring to FIG. 7, to connect the blade 40 to the cutter 10, the holder 50 is pivoted to a desired angle relative to the handle 20 to adequately expose an open front end of the holder 50 to the exterior of the handle 20. A pin 90 is inserted in the recesses 91 of the handle 20 and the apertures 57 of the holder 50 to keep the holder 50 in the desired angle relative to the handle 20.

Figure 8:
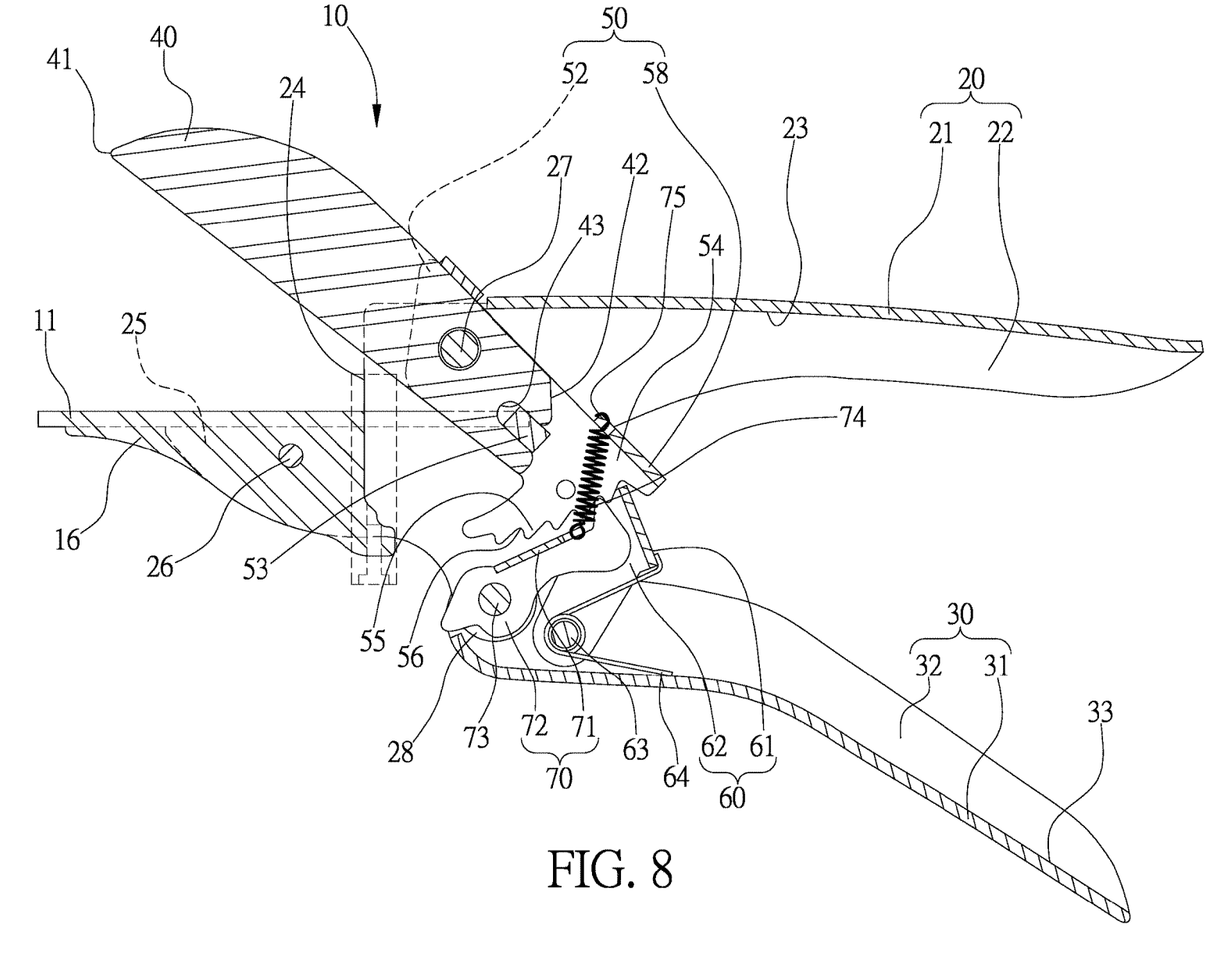
FIG. 8 is a cross-sectional view of the pipe cutter shown in FIG. 1.

Referring to FIG. 8, the rear end 42 of the blade 40 is inserted in the holder 50 via the space 23 between the lateral plates 52 so that the block 53 is inserted in the slit 43. The sleeve 82 is inserted in the aperture 84 of the handle 20, the apertures 59 of the holder 50 and the aperture 44 of the blade 40 (FIG. 6). Then, the threaded bolt 80 is inserted in the sleeve 82 and the aperture 85 of the handle 20. Finally, the threaded bolt 80 is engaged with the nut 86. The flange 83 is used like a washer between the head of the threaded bolt 80 and the handle 20 to facilitate firm engagement of the threaded bolt 80 with the nut 86 even when the cutter 10 is subject to vibration. Now, the pin 90 is moved out of the recesses 91 of the handle 20 and the apertures 57 of the holder 50.

To replace a used blade 40 with a new blade 40, the holder 50 is pivoted to the desired angle relative to the handle 20 before the pin 90 is inserted in the recesses 91 of the handle 20 and the apertures 57 of the holder 50 to keep the holder 50 in the desired angle relative to the handle 20.

The threaded bolt 80 is disengaged from the nut 86. The threaded bolt 80 is moved from the sleeve 82 and the aperture 85 of the handle 20. The sleeve 82 is moved from the aperture 84 of the handle 20, the apertures 59 of the holder 50 and the aperture 44 of the blade 40. The rear end 42 of the used blade 40 is moved from the holder 50 through the space 23 between the lateral plates 52 so that the block 53 is moved from the slit 43.

Then, the new blade 40 is connected to the cutter 10 by executing the process described above referring to FIGS. 7 and 8.

After moving the pin 90 out of the recesses 91 of the handle 20 and the apertures 57 of the holder 50, the blade 40 and the holder 50 are allowed to pivot relative to the handle 20. The front end 41 of the blade 40 extends to the exterior of the handle 20 above the cutting board 11 via the gap between the front portions 25 of the lateral plates 22 of the handle 20. The front end 41 of the blade 40 can be pivoted toward or from the cutting board 11. There is an opening (not numbered) between a closed end of the recess 12 and the top plate 21 of the handle 20 to allow a front end 41 of the blade 40 to extend to a space above the cutting board 11.

The lateral plates 62 of the pawl 60 are located between the lateral plates 32 of the handle 30. A pivot 63 is inserted in the lateral plates 32 of the handle 30 and the lateral plates 62 of the pawl 60 to pivotally connect the pawl 60 to the handle 30. The middle plate 61 is abutted against one of the teeth 55 and inserted in one of the valleys 56 of each of the ratchets 54 of the holder 50.

A torque spring 64 is used to keep the middle plate 61 of the pawl 60 against one of the teeth 55 of each of the ratchets 54 of the holder 50. The torque spring 64 includes a helical portion formed between two rectilinear portions. At least the helical portion of the torque spring 64 is located between lateral plates 62 of the pawl 60. The pivot 63 is inserted in the helical portion of the torque spring 64 to keep the torque spring 64 in position. The first rectilinear portion of the torque spring 64 is in contact with the bottom plate 31 of the handle 30. The second rectilinear portion of the torque spring 64 is in contact with the middle plate 61 of the pawl 60. The second rectilinear portion of the torque spring 64 preferably includes a bent end for hooking the middle plate 61 of the pawl 60.

The lateral plates 72 of the pawl 70 are located between the lugs 28 of the handle 20. The lugs 28 of the handle 20 are located between the lateral plates 32 of the handle 30. A pivot 73 is inserted in the lateral plates 32 of the handle 30, the lugs 28 of the handle 20 and the lateral plates 72 of the pawl 70 to pivotally connect the pawl 70 and the handles 20 and 30 to each other. The tip 74 of each of the lateral plates 72 of the pawl 70 is inserted in one of the valleys 56 of a corresponding one of the ratchets 54 of the holder 50.

A helical spring 75 is used to keep the tip 74 of each of the lateral plates 72 of the pawl 70 in contact with one of the teeth 55 of a corresponding one of the ratchets 54 of the holder 50. The helical spring 75 is formed with a first end connected to the rear top plate 58 of the holder 50 and a second end connected to the middle plate 71 of the pawl 70.

The pivots 27, 63 and 73 are preferably rivets. However, each of the pivots 27, 63 and 73 can be a combination of threaded bolt with a nut.

Preferably, the handle 20 includes a portion with a reduced width so that this portion of the handle 20 can be inserted in the handle 30. In specific, a distance between external faces of the lugs 28 of the handle 20 is marginally smaller than a distance between internal faces of the lateral plates 32 of the handle 30 so that the lugs 28 of the handle 20 can be located between the lateral plates 32 of the handle 30. The remaining portion of the handle is preferably as wide as the handle 30.

Referring to FIG. 8, in a first phase of a cutting operation, the middle plate 61 is inserted in the first valley 56 of each of the ratchets 54 of the holder 50. Now, the angle between the cutting edge of the blade 40 and an upper face of the cutting board 11 is large. A pipe (not shown) is located between the blade 40 and the cutting board 11. There is a small angle between the handles 20 and 30. Hence, it is easy for a user to hold and pivot the handles 20 and 30 toward each other to bring the blade 40 toward the cutting board 11 to cut the pipe. In detail, the handle 30 pivots the pawl 60. The pawl 60 pivots the holder 50. The holder 50 pivots the blade 40. The torque spring 64 is loaded.

Figure 9:
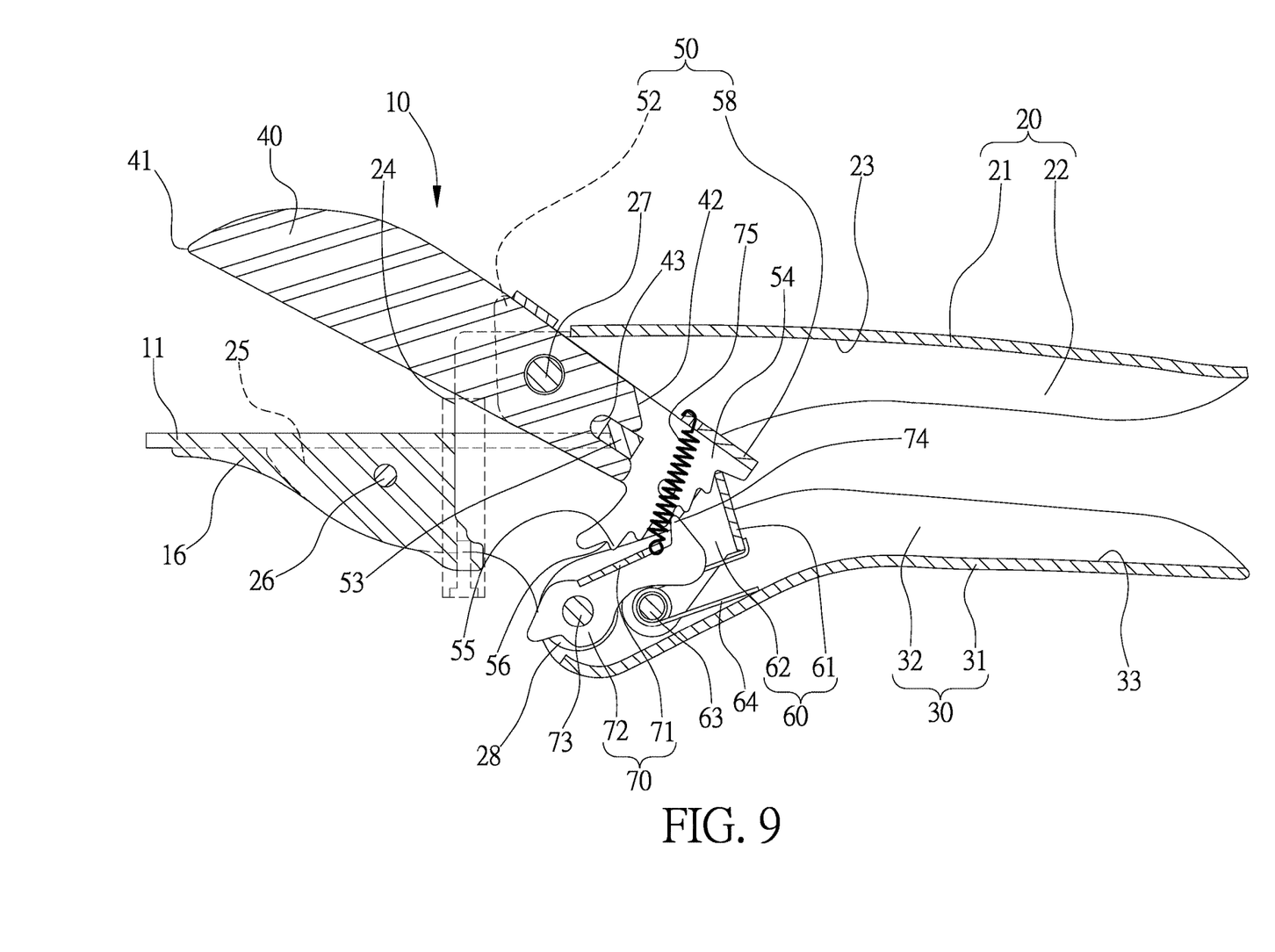
FIG. 9 is a cross-sectional view of the pipe cutter in another position than shown in FIG. 8.

Referring to FIG. 9, at the end of the first phase of the cutting operation, the handles 20 and 30 are as close to each other as possible. The pipe has not been completely cut by the blade 40 by now.

The user releases the handle 30 to allow the torque spring 64 to pivot the handle 30 from the handle 20 about the pivot 73. The handle 30 moves the pivot 63. The pivot 63 moves the pawl 60 so that the middle plate 61 of the pawl 60 is moved into the second valley 56 from the first valley 56 of each of the ratchets 54 of the holder 50.

The pawl 70 is engaged with the ratchets 54 of the holder 50 while the pawl 60 is disengaged from the ratchets 54 of the holder 50. In detail, the tip 74 of each of the lateral plates 72 of the pawl 70 is inserted in the third valley 56 of a corresponding one of the ratchets 54 of the holder 50 for example. Thus, the blade 40 is kept in position relative to the cutting board 11.

Then, the user pivots the handle 30 toward the handle 20 again to bring the cutting operation into a second phase. The middle plate 61 is inserted in the second valley 56 of each of the ratchets 54 of the holder 50 for example. The angle between the blade 40 and the cutting board 11 is smaller in the second phase than in the first phase because the pipe is partially cut. There is still a small angle between the handles 20 and 30. Hence, it is still easy for the user to hold and pivot the handles 20 and 30 toward each other again to bring the blade 40 further toward the cutting board 11 to further cut the pipe.

The pawl 60 moves the rear end of the holder 50 from the pawl 70 as the user pivots the handle 30 toward the handle 20. Thus, the tip 74 of each lateral plate 72 of the pawl 70 is moved into the fourth valley 56 from the third valley 56 of the corresponding one ratchet 54.

At the end of the second phase of the cutting operation, the handles 20 and 30 are as close to each other as possible. The pipe has not been completely cut by the blade 40 by now.

The user releases the handle 30 to allow the torque spring 64 to pivot the handle 30 from the handle 20 about the pivot 73. The handle 30 moves the pivot 63. The pivot 63 moves the pawl 60 so that the middle plate 61 of the pawl 60 is moved into the third valley 56 from the second valley 56 of each of the ratchets 54 of the holder 50.

The pawl 70 is engaged with the ratchets 54 of the holder 50 while the pawl 60 is disengaged from the ratchets 54 of the holder 50. In detail, the tip 74 of each lateral plate 72 of the pawl 70 is kept in the fourth valley 56 of the corresponding ratchet 54 of the holder 50 for example. Thus, the blade 40 is retained in position relative to the cutting board 11.

Then, the user pivots the handle 30 toward the handle 20 again to bring the cutting operation into a third phase. The middle plate 61 is inserted in the third valley 56 of each of the ratchets 54 of the holder 50 for example.

Figure 10:
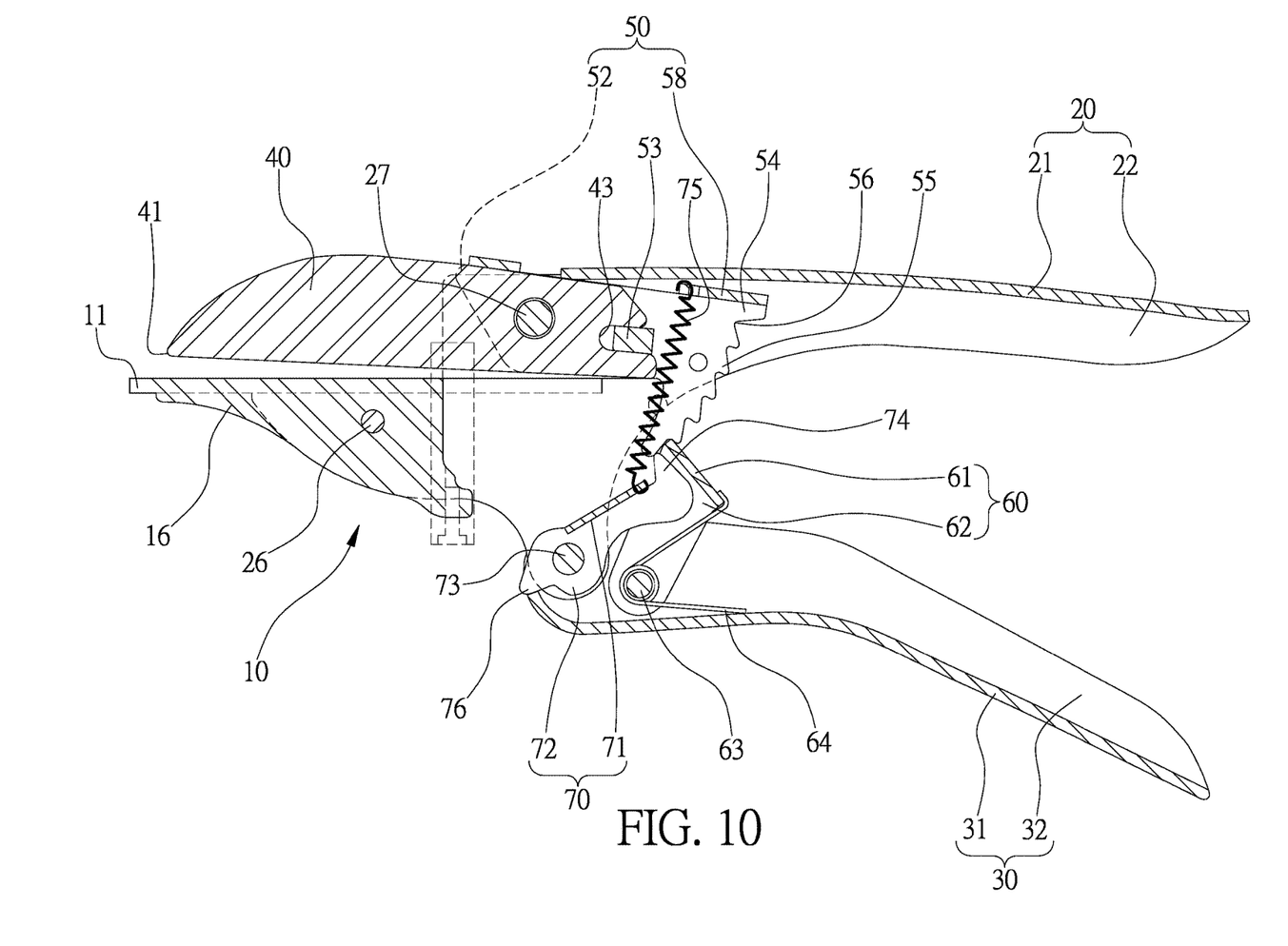
FIG. 10 is a cross-sectional view of the pipe cutter in another position than shown in FIG. 9.

Referring to FIG. 10, in a final phase of the cutting operation, the middle plate 61 of the pawl 60 is inserted in the last valley 56 of each of the ratchets 54 of the holder 50. The angle between the blade 40 and the cutting board 11 is smaller in the last phase than in any previous phase. There is still a small angle between the handles 20 and 30. Hence, it is still easy for a user to hold and pivot the handles 20 and 30 toward each other again to bring the blade 40 further toward the cutting board 11 to further cut the pipe.

Figure 11:
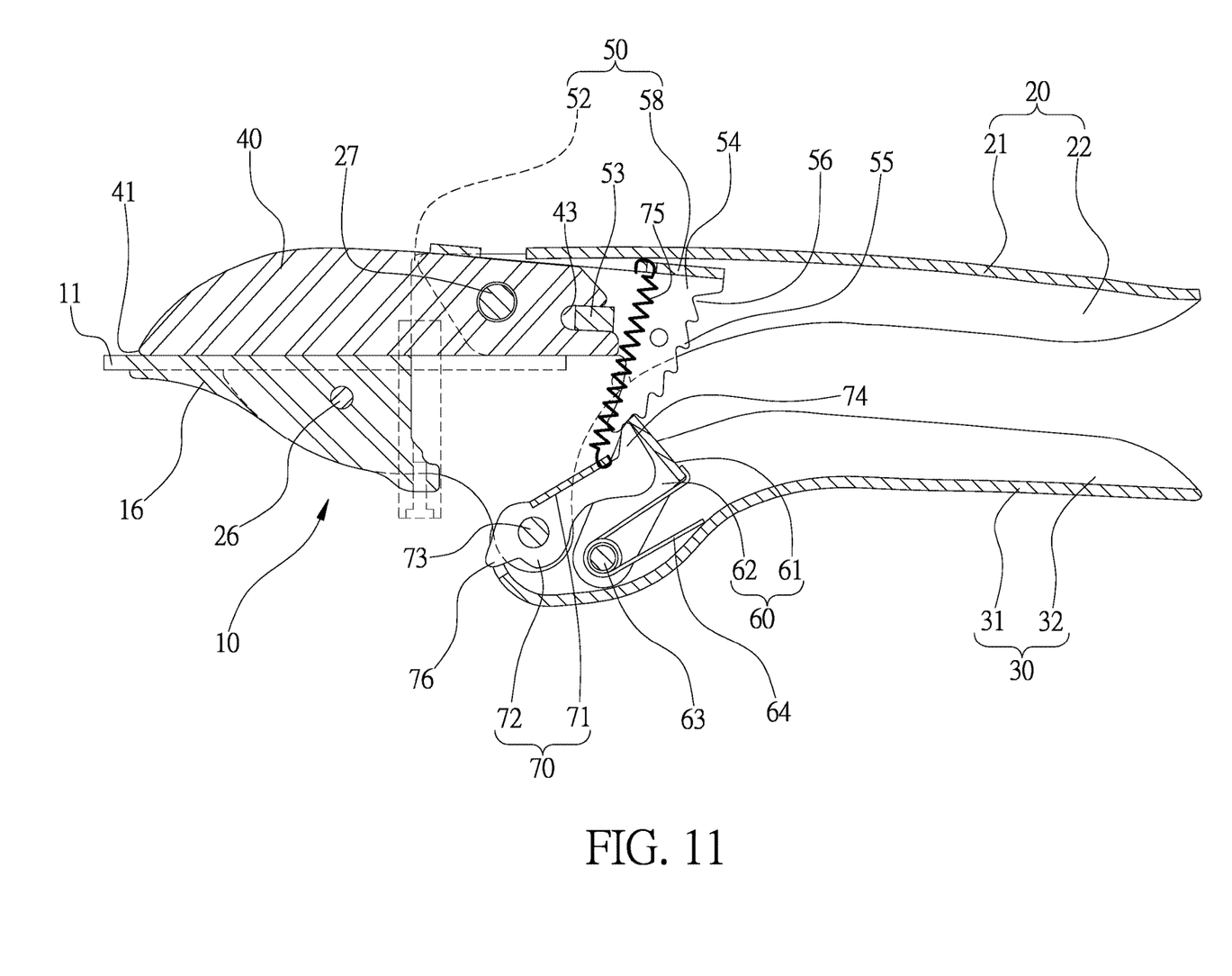
FIG. 11 is a cross-sectional view of the pipe cutter in another position than shown in FIG. 10.

Referring to FIG. 11, at the end of the final phase of the cutting operation, the handles 20 and 30 are as close to each other as possible. The pipe is completely cut by the blade 40.

Figure 12:
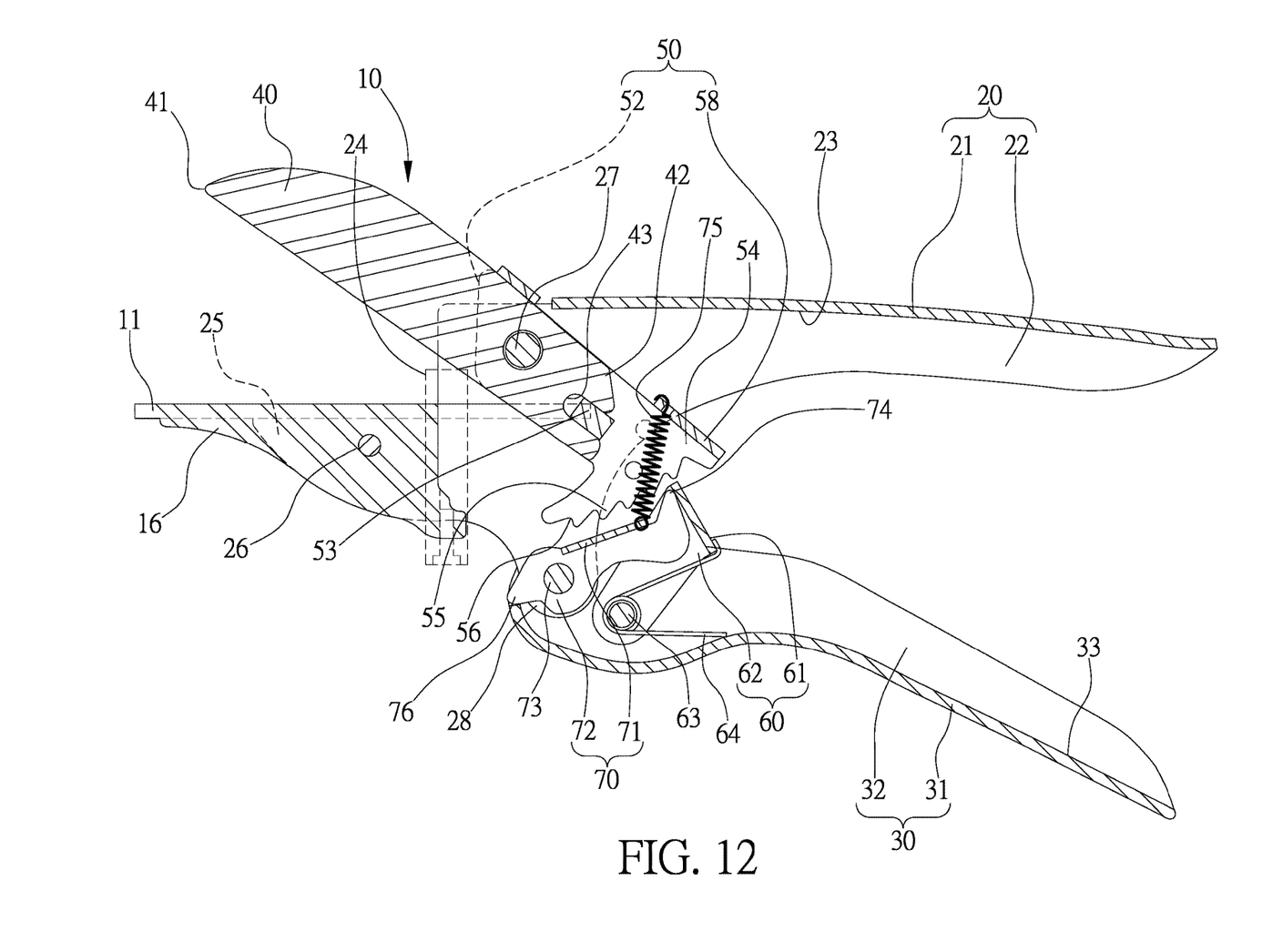
FIG. 12 is a cross-sectional view of the pipe cutter in another position than shown in FIG. 11.

Referring to FIG. 12, to bring the cutter 10 back to the original position, the handle 30 is pivoted away from the handle 20 so that a front end of the bottom plate 31 of the handle 30 abuts against the tips 76 of the lateral plates 72 of the pawl 70. Thus, the pawl 70 is pivoted. Then, the tips 74 of the lateral plates 72 of the pawl 70 are disengaged from the ratchets 54 of the holder 50 to allow the helical spring 75 to pivot the blade 40 from the cutting board 11, i.e., to enlarge the angle between the blade 40 and the cutting board 11. Finally, the middle plate 61 of the pawl 60 is inserted in the first valley 56 of each of the ratchets 54 of the holder 50 again. Now, the cutter 10 is ready for another cutting operation.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A cutter comprising:
   a blade comprising an aperture and a slit;
   a first handle comprising two lateral plates each of which comprises a front portion, an aperture and a recess;
   a holder comprising two lateral plates located between the lateral plates of the first handle and a block formed between the lateral plates of the holder, wherein the block of the holder is inserted in the slit of the blade when the blade is inserted in the holder, wherein each of the lateral plates of the holder comprises a rear aperture and a front aperture;
   a first pivot selectively inserted in the apertures of the first handle, the front apertures of the holder and the aperture of the blade to keep the holder in the first handle; and
   a pin selectively inserted in the recesses of the first handle and the rear apertures of the holder to keep the holder in a desired angle relative to the first handle.

2. The cutter according to claim 1, wherein the first pivot comprises a threaded bolt and a nut engaged with the threaded bolt.

3. The cutter according to claim 2, wherein the first pivot further comprises a sleeve selectively inserted in the aperture of the blade, the front apertures of the holder and at least one of the apertures of the first handle, wherein the threaded bolt is inserted in the sleeve.

4. The cutter according to claim 3, wherein the sleeve comprises a flange used as washer.

5. The cutter according to claim 1, further comprising:
   a cutting board formed with a fin located between the front portions of the lateral plates of the first handle;
   a second handle comprising two lateral plates located on two sides of the lateral plates of the first handle;
   a first pawl comprising two lateral plates and a middle plate formed between the lateral plates of the first pawl;
   a second pivot inserted in the lateral plates of the second handle and the lateral plates of the first pawl;
   a torque spring comprising an end in contact with the middle plate of the first pawl and another end in contact with the second handle;
   a second pawl comprising two lateral plates and a middle plate formed between the lateral plates of the second pawl, wherein each of the lateral plates of the second pawl comprises a first tip;
   a third pivot inserted in the lateral plates of the second handle, the lateral plates of the first handle and the lateral plates of the second pawl; and
   a helical spring comprising an end connected to the middle plate of the second pawl and another end connected to the holder;
   wherein each of the lateral plates of the holder comprises a ratchet;
   wherein the torque spring keeps the middle plate of the first pawl engaged with the ratchets;

wherein the helical spring keeps the first tips of the lateral plates of the second pawl engaged with the ratchets.

6. The cutter according to claim 5, wherein each of the lateral plates of the first handle comprises a lug located between the lateral plates of the second handle, wherein the third pivot is inserted in the lugs.

7. The cutter according to claim 5, wherein the first handle comprises a top plate formed between the lateral plates of the first handle, wherein the cutting board comprises a recess for receiving the lateral plates of the first handle, wherein there is an opening between a closed end of the recess and the top plate of the first handle to allow a front end of the blade to extend to a space above the cutting board from the holder.

8. The cutter according to claim 7, wherein each of the lateral plates of the first handle comprises a stepped portion formed between the front portion and a rear portion, wherein the stepped portions of the lateral plates of the first handle are inserted in the recess.

9. The cutter according to claim 5, wherein the second handle comprises a bottom plate formed between the lateral plates of the second handle, wherein the bottom plate pushes a second tip of each of the lateral plates of the second pawl to disengage the first tip of each of the lateral plates of the second pawl from a corresponding one of the ratchets of the holder when the second handle is completely pivoted away from the first handle.

* * * * *